United States Patent
Khan (10) Patent No.: US 9,548,910 B2
(45) Date of Patent: Jan. 17, 2017

(54) DISTRIBUTED SYSTEM ARCHITECTURE USING EVENT STREAM PROCESSING

(71) Applicant: Asif Khan, Santa Clara, CA (US)

(72) Inventor: Asif Khan, Santa Clara, CA (US)

(73) Assignee: SAP SE, Walldorf (DE)

( * ) Notice: Subject to any disclaimer, the term of this patent is extended or adjusted under 35 U.S.C. 154(b) by 162 days.

(21) Appl. No.: 14/283,509

(22) Filed: May 21, 2014

(65) Prior Publication Data

US 2015/0341231 A1 Nov. 26, 2015

(51) Int. Cl.
*H04L 12/26* (2006.01)
*H04L 29/08* (2006.01)
*H04L 29/06* (2006.01)

(52) U.S. Cl.
CPC ............ *H04L 43/04* (2013.01); *H04L 29/08* (2013.01); *H04L 67/02* (2013.01); *H04L 67/10* (2013.01); *H04L 67/42* (2013.01)

(58) Field of Classification Search
CPC .. H04L 47/6285; H04L 47/629; H04L 47/762; H04L 47/801; H04L 49/90; H04L 49/901; H04L 5/0035; H04L 5/0048; H04L 5/0053; H04L 5/1469; H04L 61/2514; H04L 61/2575; H04L 61/2589; H04L 43/04; H04L 67/02; H04L 67/42; H04L 29/08; H04L 67/10
USPC ................. 709/219, 221, 224, 245; 726/1–2
See application file for complete search history.

(56) References Cited

U.S. PATENT DOCUMENTS

| | | | | |
|---|---|---|---|---|
| 2008/0189352 A1* | 8/2008 | Mitchell | ................. | G06F 9/542 709/201 |
| 2009/0265288 A1* | 10/2009 | Chakravarty | .......... | G06N 5/022 706/11 |
| 2010/0257052 A1* | 10/2010 | Zito | ........................ | G06Q 30/02 705/14.45 |
| 2011/0093490 A1* | 4/2011 | Schindlauer | ...... | G06F 17/30477 707/769 |
| 2013/0219483 A1* | 8/2013 | Cho | ........................ | G06F 21/56 726/13 |
| 2013/0332219 A1* | 12/2013 | Clark | ..................... | G06Q 30/02 705/7.19 |
| 2015/0067678 A1* | 3/2015 | Naseh | ................. | G06F 9/45558 718/1 |

* cited by examiner

*Primary Examiner* — David Lazaro
*Assistant Examiner* — Berhanu Shitayewoldetsadi
(74) *Attorney, Agent, or Firm* — Schwegman Lundberg & Woessner, P.A.

(57) ABSTRACT

A system and method for performing event stream processing is described. A plurality of event streams are received from a plurality of input adapters, at least a first input adapter of the plurality of input adapters being located on a separate and distinct virtual machine than a second input adapter of the plurality of input adapters. Event stream data from the first input adapter and event stream data from the second input adapter are transformed into data of a single data type. The transformed data is stored in an in-memory database. Then real-time analysis is performed on the transformed data by accessing windows of the transformed data from the in-memory database based on rules defined in the event stream processing engine.

17 Claims, 7 Drawing Sheets

DISTRIBUTED SYSTEM ARCHITECTURE USING EVENT STREAM PROCESSING

TECHNICAL FIELD

This document generally relates to systems and methods for use with a distributed system architecture. More specifically, this document relates to methods and systems for a distributed system architecture using event stream processing.

BACKGROUND

Event stream processing (ESP) is a set of technologies designed to assist the construction of event-driven information systems. ESP technologies can include event visualization, event databases, event-driven middleware, and event processing languages, or complex event processing (CEP). ESP deals with the task of processing multiple streams of event data with the goal of identifying the meaningful events within those streams. ESP enables applications such as algorithmic trading in financial services, radio frequency identification (RFID) event processing applications, fraud detection, process monitoring, and location-based services in mobile devices. Within an ESP system a continuous data stream (comprising multiple, consecutive data items) is pushed through a query. Results of the query are subsequently pushed out of the system. While ESP systems generally work well for smaller-to-medium sized systems, scaling becomes a problem in larger systems. Specifically, function bundles deployed on multiple virtual machines are not able to transfer and process data in an efficient-enough manner to ensure reliability and speed in high-frequency event stream scenarios, such as high-frequency securities trading and real-time sales reporting.

BRIEF DESCRIPTION OF DRAWINGS

The present disclosure is illustrated by way of example and not limitation in the figures of the accompanying drawings, in which like references indicate similar elements and in which.

DETAILED DESCRIPTION

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art, that embodiments of the inventive subject matter can be practiced without these specific details. In general, well-known instruction instances, protocols, structures, and techniques have not been shown in detail.

In an example embodiment, a complex event processing (CEP) engine is used as a routing and data transformation engine in a cloud environment to achieve better performance, modularization, and extensibility. Data can be published to the CEP engine via adapters, without being hosted on the same virtual machine and without utilizing restrictive tenant concepts. Restrictive tenant concepts will be described in more detail below. Data can be pulled from other clouds by the CEP engine. Multiple disparate data types flowing from various providers can be transformed inside the CEP engine into a standard for consumption. Processed data can then be stored in an in-memory database and read from windows, which improves performance. Duplicates can then be checked for and advanced business process modeling techniques can be performed using CEP in real-time in an efficient and speedy manner, allowing the system to handle high-frequency events.

Figure 1:
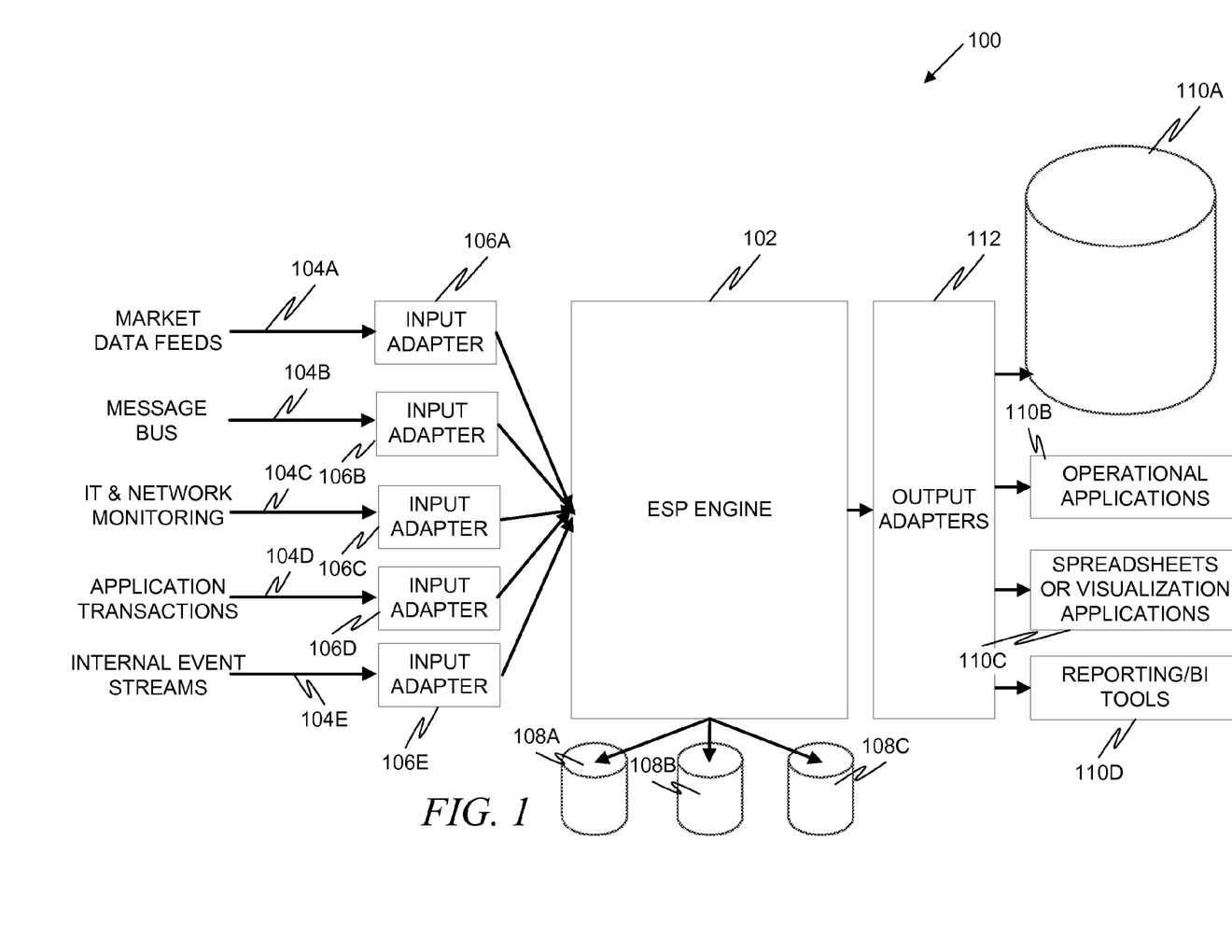
FIG. 1 is a diagram illustrating a system for event stream processing in accordance with an example embodiment.

FIG. 1 is a diagram illustrating a system 100 for event stream processing in accordance with an example embodiment. An ESP engine 102 can receive one or more event streams 104A-104E via input adapters 106A-106E. The event streams 104A-104E can relate to, for example, market data feeds, message buses, network monitoring, application transactions, internal event streams, etc. Notably, as will be described in more detail later, each event stream 104A can be received from a source on a different virtual machine. Additionally, each input adapter 106A-106E can be located on a different virtual machine as well. The system 100 is able to process event streams 104A-104E in real-time and provide real-time analysis despite these limitations. The ESP engine 102 can also communicate with one or more external databases 108A-108C. In an example embodiment, these external databases 108A-108C can be disk storage databases.

The ESP engine 102 can also communicate with an internal database 110A. In an example embodiment, the ESP engine 102 acts as a routing and data transformation engine that operates with the internal database 110A to allow for the publishing of data for CEP via adapters without being hosted on the same virtual machine and without using restrictive tenant concepts to allow for significantly increased performance in scaled scenarios.

While this database 110A is labeled as internal, it is possible that the database 110A resides on separate hardware than the ESP engine 102. The distinction between an internal database 110A and external database 108A-108C is that the internal database 110A can be more natively supported for communication purposes with the ESP engine 102. In an example embodiment, the internal database 110A and ESP engine 102 are both designed by the same software provider, whereas the external databases 108A-108C are designed by other software providers. The communication between the ESP engine 102 and the internal database 110A can be performed via one or more output adapters 112. It should be noted that in some example embodiments the output adapters 112 may be unnecessary. Additionally, the ESP engine 102 can communicate with, for example, operational applications 110B, spreadsheets or visualization applications 110C, and reporting/business intelligence (BI) tools 110D.

In an example embodiment, the internal database 110A is an in-memory database. An in-memory database is a database management system that primarily relies on main memory for computer data storage. It is contrasted with database management systems that employ a disk storage mechanism.

Figure 2:
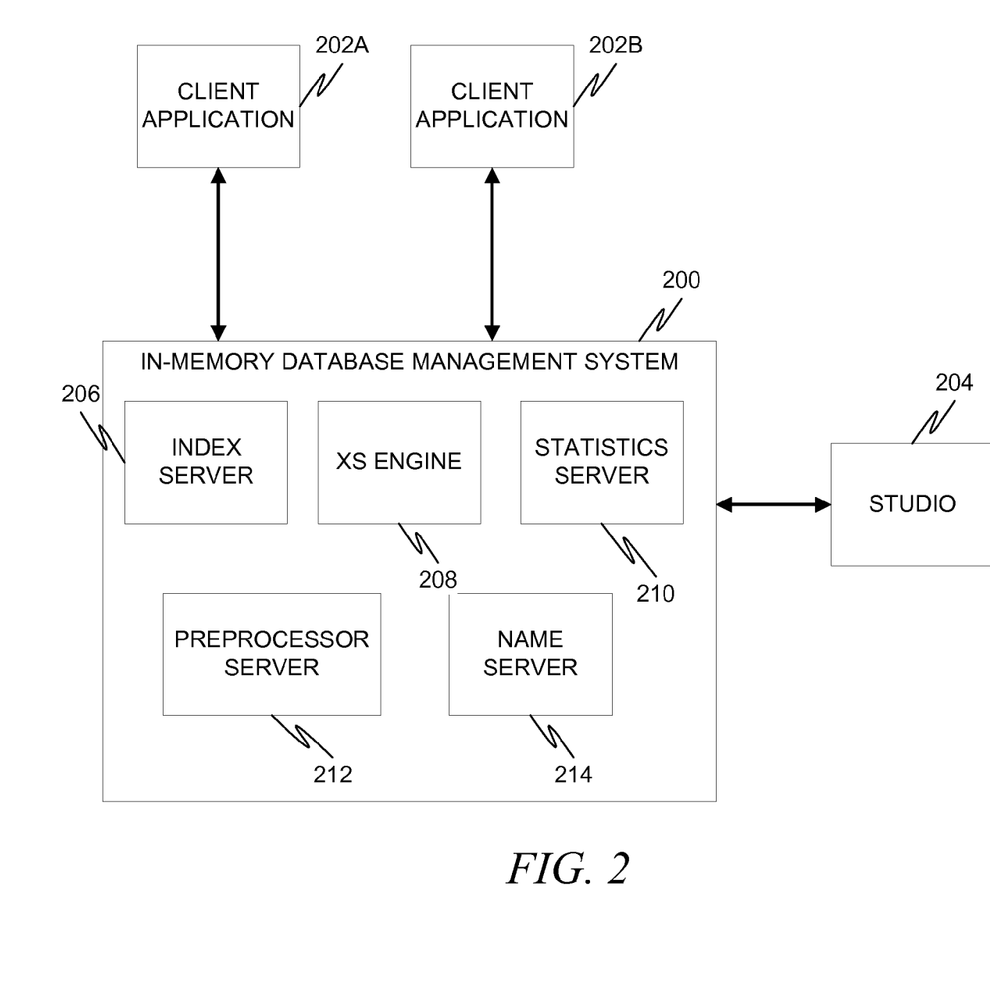
FIG. 2 is a diagram illustrating an in-memory database management system in accordance with an example embodiment.

FIG. 2 is a diagram illustrating an in-memory database management system 200 in accordance with an example embodiment. For example, the in-memory database management system can be the internal database 110A in FIG. 1. Here, the in-memory database management system 200 can be coupled to one or more client applications 202A, 202B. The client applications 202A, 202B can communicate with the in-memory database management system 200 through a number of different protocols, including Structured Query Language (SQL), Multidimensional Expressions (MDX), Hypertext Transfer Protocol (HTTP), Representational State Transfer (REST), and Hypertext Markup Language (HTML). As described earlier, one or more of these client applications 202A, 202B can be an ESP engine, such as, for example, ESP engine 102 from FIG. 1.

Also depicted is a studio 204, used to perform modeling by accessing the in-memory database management system 200. In an example embodiment, integration of ESP functionality (e.g., storing of event information) into the internal database 110A occurs through studio 204. The studio 204 can allow complex analysis to be performed on data drawn from not only real time event data and windows, but also from stored database information.

The in-memory database management system 200 can comprise a number of different components, including index server 206, XS engine 208, statistics server 210, preprocessor server 212, and name server 214. These components can operate on a single computing device, or can be spread among multiple computing devices (e.g., separate servers).

The index server 206 contains the actual data and the engines for processing the data. The index server 206 also coordinates and uses all the other servers.

The XS engine 208 allows clients to connect to the database system 100 using web protocols, such as Hypertext Transfer Protocol (HTTP).

The statistics server 210 collects information about status, performance, and resource consumption from all the other server components. The statistics server 210 can be accessed from the studio 204 to obtain the status of various alert monitors.

The preprocessor server 212 is used for analyzing text data and extracting the information on which the text search capabilities are based.

The name server 214 holds information about the database topology. This is used in a distributed system with instances of the database on different hosts. The name server 214 knows where the components are running and which data is located on which server.

Between the ESP engine 102 and the in-memory database management system 200 an architecture is provided that can work at both the machine time scale as well as at the human time scale. The XS engine 208, which can include a definition language, can be used to provide human/computer interactions. The XS engine 208 can communicate directly with the ESP engine 102 and the index server 206. The index server 206 can be used for data analysis of past events.

The interaction between the ESP engine 102, XS engine 208 and index server 206 allows the architecture to provide high-speed analysis from various data sources without the data sources, or their corresponding adapters, residing on the same virtual machine, and without using restrictive tenant concepts. In an example embodiment, the ESP engine 102 is able to access all of the streamed data over the course of a day, or at least be tightly integrated with the index server 206 so that the two together can access all of the streamed data over the course of a day. In the latter case, a large channel can be provided between the ESP engine 102 and the index server 206 to absorb the entire data stream so the entire data stream can be persisted in the index server 206. A second, smaller channel can be provided from the index server 206 back to the ESP engine 102 so that the ESP engine 102 can combine the historical data calculation of the index server 206 with real-time stream calculations from the ESP engine 102. Both the ESP engine 102 and the index server 206 can also open channels to the XS engine 208 so that the ESP engine 102 and index server 206 can respond to any human agent requests.

As stated earlier, this solution does not require the data sources or their adapters to be hosted on the same virtual machine. Additionally, this solution does not need to rely on a restrictive tenant arrangement. A restrictive tenant arrangement is one where each customer (tenant) is provided a dedicated space on a common shared architecture, and each customer (tenant) is restricted to only accessing that particular dedicated space. While this dedicated space can be spread out over multiple physical machines in a cloud or cloud-like environment, each customer (tenant) is still dedicated particular space and is restricted to access only that dedicated space.

Additionally, the ESP engine 102 can act to transform multiple disparate data types flowing from the different input data streams 102A-102E via adapters 106A-106E. These can be transformed into a single data type for use by the in-memory database management system 200, to allow for easy and efficient analysis. In an example embodiment, the transformation can be to a standard data type. The ESP engine 102 can also act to check for duplicates in the transformed data and perform advanced business process modeling.

Traditional ESP functionality allows for event data to be analyzed in the form of both real-time streams and windows. Traditional ESP functionality also includes the ability to join streams and windows. In an example embodiment, however, these windows are read directly from an in-memory database, significantly improving performance. Additionally, through data integration, the ESP engine 102 can also allow joining streams and windows with database tables. This allows for the possibility of including persisted data in real-time continuous queries.

The ESP engine 102 can access the table data during joins as needed, and fetch table data in real-time. Alternatively, table data can be cached based on user configuration.

The ESP engine 102 can also store and utilize one or more defined rules, which can be executed in real-time to act on the data from the input data streams 102A-102E. These rules can be defined by, for example, an administrator wishing to perform certain analysis or filtering of the event data. The rules can be, for example, mathematical models or business semantics. The rules can also define how the ESP engine 102 interacts with the index server 206 and/or XS engine 208.

Figure 3:
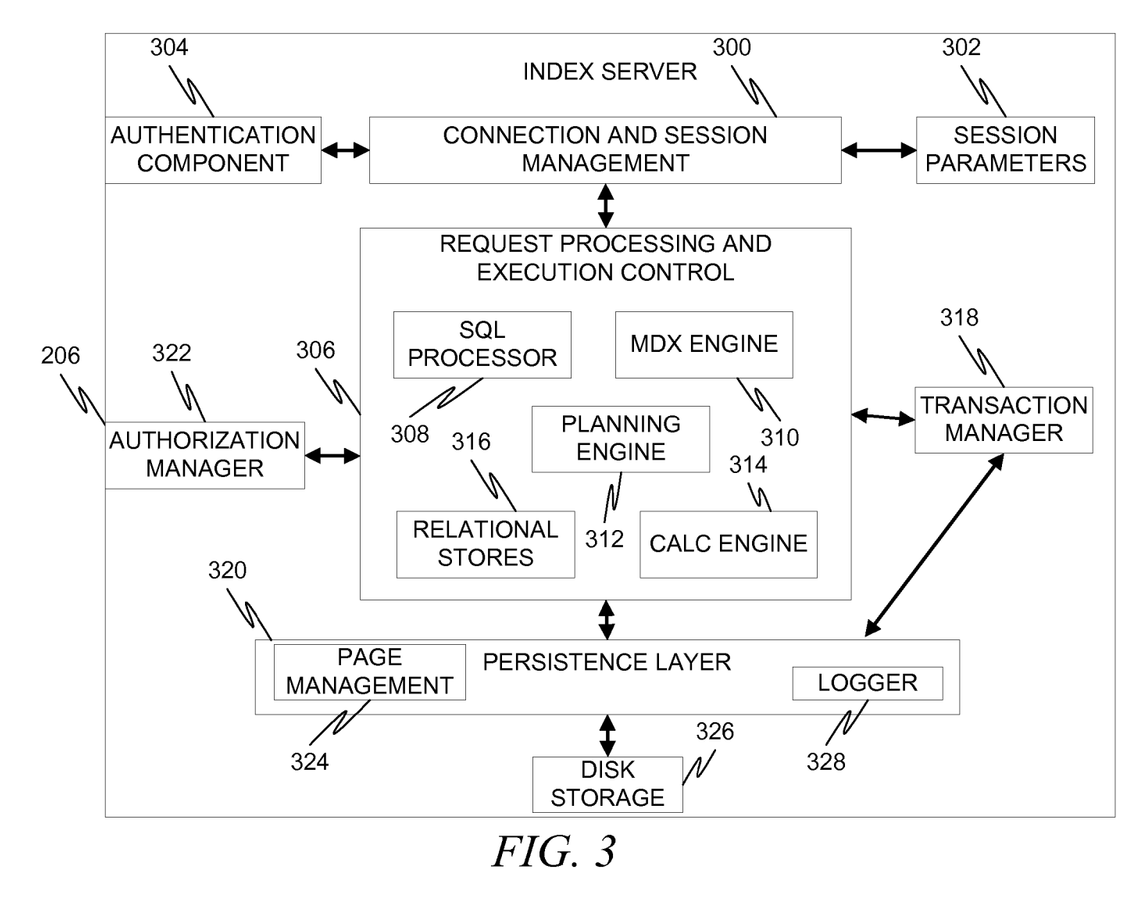
FIG. 3 is a diagram illustrating an index server in accordance with an example embodiment.

FIG. 3 is a diagram illustrating an index server 206 in accordance with an example embodiment. Specifically, the index server 206 of FIG. 2 is depicted in more detail. The index server 206 includes a connection and session management component 300, which is responsible for creating and managing sessions and connections for the database clients. Once a session is established, clients can communicate with the database system using SQL statements. For each session, a set of session parameters 302 can be maintained, such as auto-commit, current transaction isolation level, etc. Users (e.g., system administrators, developers) are authenticated either by the database system itself (e.g., login with user name and password, using authentication component 304) or authentication can be delegated to an external authentication provider such as a Lightweight Directory Access Protocol (LDAP) directory.

The client requests can be analyzed and executed by a set of components summarized as request processing and execution control 306. The SQL processor 308 checks the syntax and semantics of the client SQL statements and generates a logical execution plan. Multidimensional expressions (MDX) is a language for querying and manipulating multidimensional data stored in Online Analytical Programming (OLAP) cubes. As such, an MDX engine 310 is provided to allow for the parsing and executing of MDX commands. A planning engine 312 allows applications (e.g., financial planning applications) to execute basic planning operations in the database layer. One such operation is to create a new version of a dataset as a copy of an existing dataset, while applying filters and transformations. Aspects described above of the present solution can be implemented in the planning engine 312. Specifically, the planning engine 312 can be used to persist real-time streaming information from an ESP engine 102 as well as provide real-time analysis of event stream information stored in the relational stores 316.

A calc engine 314 implements the various SQL script and planning operations. The calc engine 314 creates a logical execution plan for calculation models derived from SQL script, MDX, planning, and domain-specific models. This logical execution plan can include, for example, breaking up a model into operations that can be processed in parallel.

The data is stored in relational stores 316, which implement a relational database in main memory.

Each SQL statement can be processed in the context of a transaction. New sessions are implicitly assigned to a new transaction. The transaction manager 318 coordinates database transactions, controls transactional isolation, and keeps track of running and closed transactions. When a transaction is committed or rolled back, the transaction manager 318 informs the involved engines about this event so the engines can execute needed actions. The transaction manager 318 also cooperates with a persistence layer 320 to achieve atomic and durable transactions.

An authorization manager 322 is invoked by other database system components to check whether the user has the specified privileges to execute the requested operations. The database system allows for the granting of privileges to users or roles. A privilege grants the right to perform a specified operation on a specified object.

The persistence layer 320 ensures that the database is restored to the most recent committed state after a restart and that transactions are either completely executed or completely undone. To achieve this goal in an efficient way, the persistence layer 320 uses a combination of write-ahead logs, shadow paging, and save points. The persistence layer 320 also offers a page management interface 324 for writing and reading data to a separate disk storage 326, and also contains a logger 328 that manages the transaction log. Log entries can be written implicitly by the persistence layer 320 when data is written via the persistence interface or explicitly by using a log interface.

Figure 4:
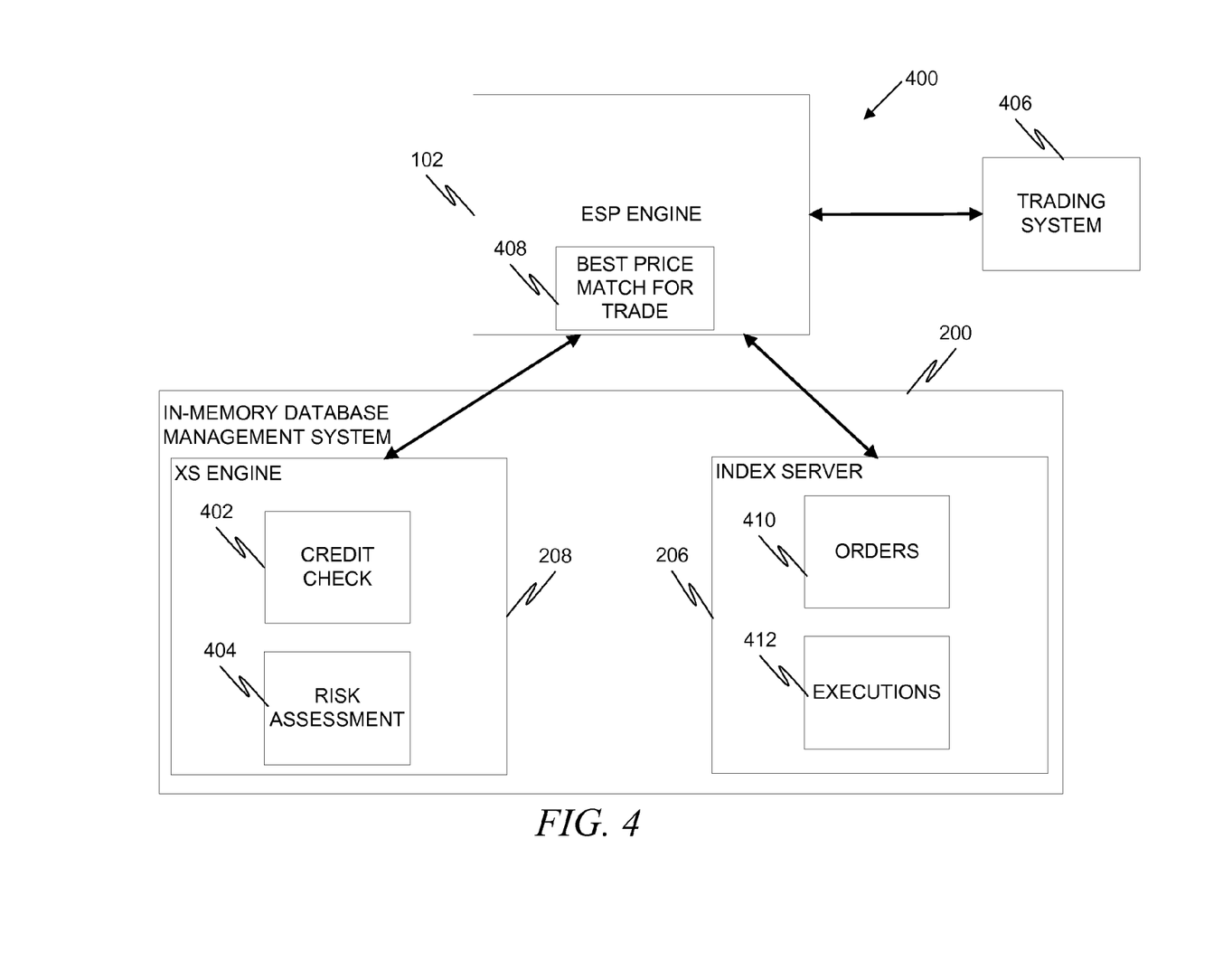
FIG. 4 is a block diagram illustrating a system for use in a banking environment in accordance with this example embodiment.

An example will be provided herein of a banking environment. FIG. 4 is a block diagram illustrating a system for use in a banking environment in accordance with this example embodiment. This diagram presents a simplified version of the components described above with respect to FIGS. 1-3. The system 400 includes an in-memory database management system 200 having an index server 206 and an XS engine 208. The XS engine 208 can perform tasks such as a credit check 402 and a risk assessment 404. These tasks can be performed, for example, in anticipation of a securities trade. For example, a customer can be on the phone with a trade desk asking to perform a securities trade. The trade desk can then use the XS engine 208 to perform a credit check 402 and risk assessment 404 for the customer, which can then be performed and results displayed in less than a second. Essentially the trade desk can ask a question of the XS engine 208 while on the phone with the customer and receive an immediate answer. The customer data can be synced to the XS engine 208 from either the index server 206 or other systems. This could be a batch or a real-time update based on executions.

After satisfying the customer's and trade desk's questions, the trade desk can negotiate an order with the customer. The trade desk is able to look at real-time calculations from the ESP engine 102, based on event data from the trading system 406 to meet the customer's need in almost instantaneous fashion. These calculations are run on high volumes of real-time data feeds from trading systems to the ESP engine 102. Once the trade desk executes a negotiated order (best price match for trade 408), the execution data is written from the ESP engine 102 to the index server 206 (as well as any other systems of choice) using a high performance output adapter 112. This data may include outstanding orders 410 and executions 412. This high performance output adapter 112 can be designed specifically to be used with the in-memory database management system 200 and can be built into the ESP engine 102.

Notably, the ESP engine 102 acts as a bridge between the trading system 406 and the in-memory database management system 200, and also as a bridge between the index server 206 and the XS engine 208.

Figure 5:
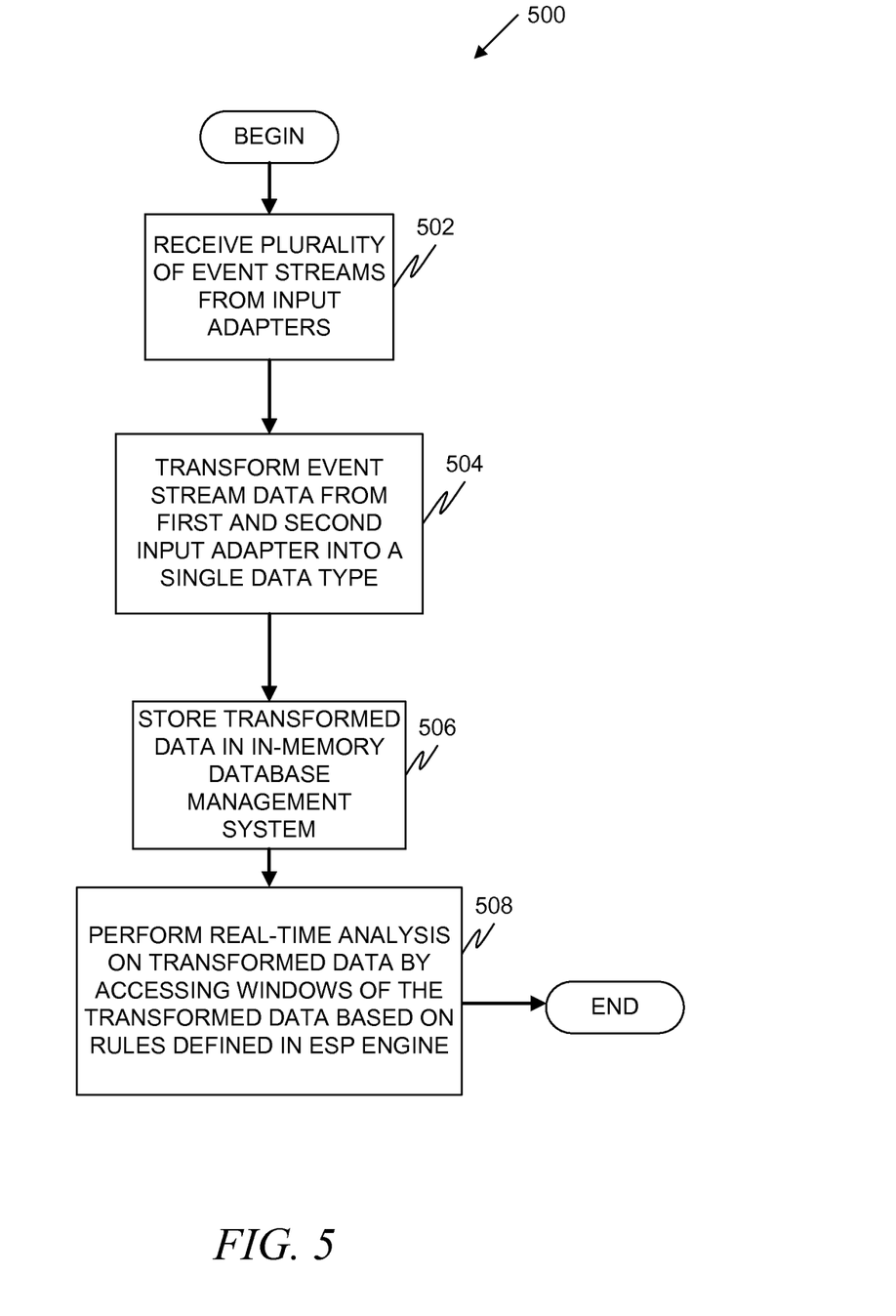
FIG. 5 is a flow diagram illustrating a method, in accordance with an example embodiment, of performing event stream processing.

FIG. 5 is a flow diagram illustrating a method 500, in accordance with an example embodiment, of performing event stream processing. Method 500 can be performed by processing logic that can comprise hardware (e.g., circuitry, dedicated logic, programmable logic, microcode, etc.), software (e.g., instructions run on a processing device), or a combination thereof. At operation 502, a plurality of event streams 104 are received from a plurality of input adapters 106, at least a first input adapter of the plurality of input adapters 106 being located on a separate and distinct virtual machine than a second input adapter 106 of the plurality of input adapters 106. In an example embodiment, operation 502 can be performed by an ESP engine, such as the ESP engine 102 of FIG. 1. Additionally, in an example embodiment, the first input adapter 106 and the second input adapter 106 are not stored on a shared architecture as part of a restrictive tenant arrangement.

At operation 504, event stream data from the first input adapter and event stream data from the second input adapter 106 can be transformed into a single data type. In one example, the event stream data from the second input adapter 106 can be changed into the data type of the event stream data from the first input adapter 106. In another example, the event stream data from the first input adapter 106 can be changed into the data type of the event stream data from the second input adapter 106. In another example, the event stream data from the first input adapter 106 and the event stream data from the second input adapter 106 can both be changed into a data type not used by either the event stream data from the first input adapter 106 or the event stream data from the second input adapter 106. The organization of the event stream data from both the first input adapter 106 and the second input adapter 106 can be altered so that the formats are identical (e.g., the beginnings of similar or identical fields line up). In an example embodiment, operation 504 can be performed by an ESP engine, such as the ESP engine 102 of FIG. 1.

At operation 506, the transformed data is stored in an in-memory database. In an example embodiment, operation 506 can be performed by an in-memory database management system such as in-memory database management system 200 of FIG. 2, or more precisely by the index server 206 of FIG. 2.

At operation 508, real-time analysis is performed on the transformed data by accessing windows of the transformed data from the in-memory database based on rules defined in the event stream processing engine. In an example embodiment, this real-time analysis can be performed by the ESP engine 102 of FIG. 1, based on input from the XS server 208 of FIG. 2.

In an example embodiment, the ESP engine 102 and the in-memory database management system 200 are part of a first cloud. In such a case, the ESP engine 102 is able to process event streams 104 of data from the first cloud as well as from other clouds, and can also retrieve additional non-event stream information from other clouds for use in executing the rules for processing the event stream information from the adapters in the first cloud.

Example Mobile Device

Figure 6:
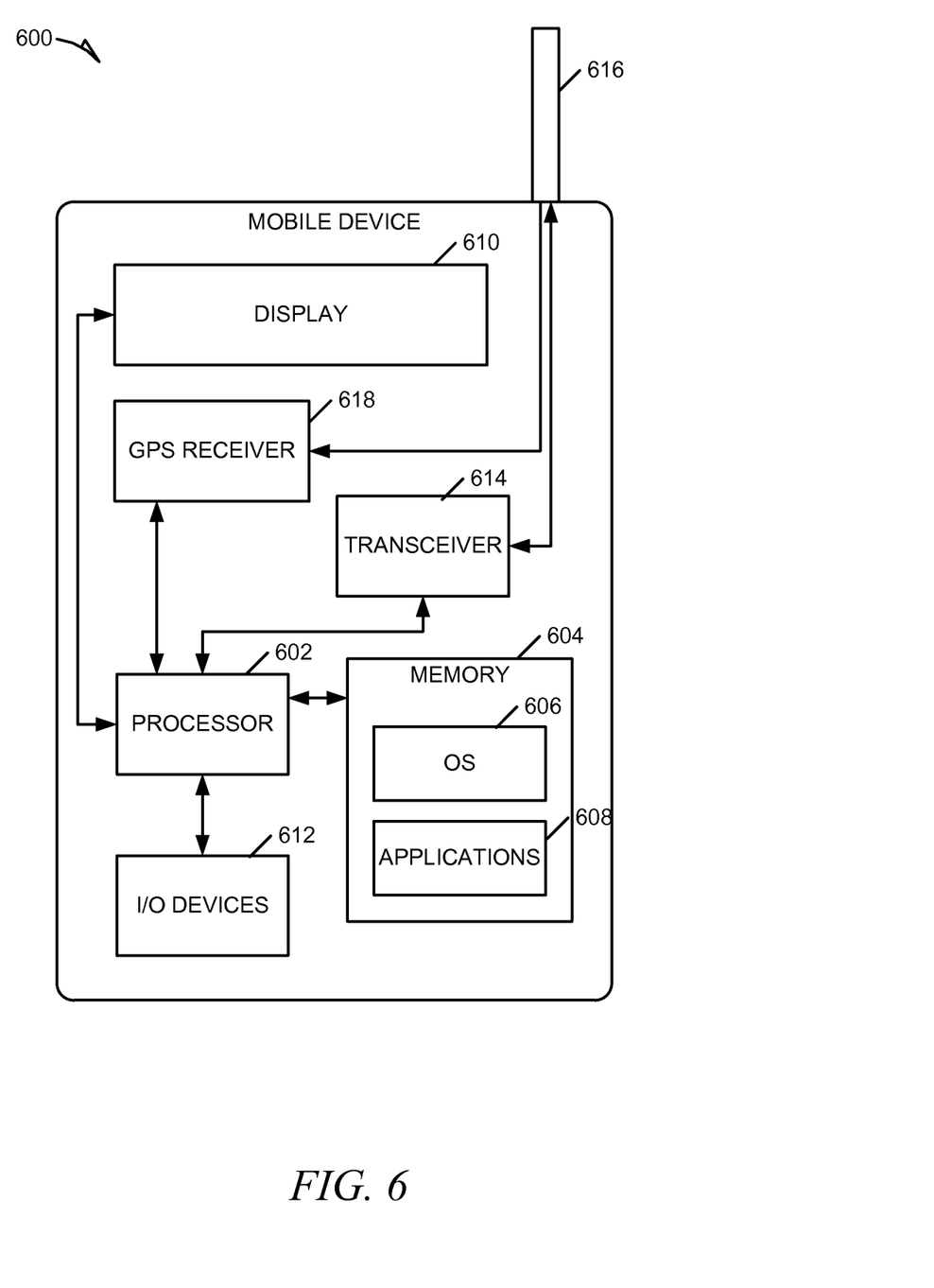
FIG. 6 is a block diagram illustrating a mobile device, according to an example embodiment.

FIG. 6 is a block diagram illustrating a mobile device 600, according to an example embodiment. The mobile device 600 can include a processor 602. The processor 602 can be any of a variety of different types of commercially available processors 602 suitable for mobile devices 600 (for example, an XScale architecture microprocessor, a microprocessor without interlocked pipeline stages (MIPS) architecture processor, or another type of processor 602). A memory 604, such as a random access memory (RAM), a flash memory, or other type of memory, is typically accessible to the processor 602. The memory 604 can be adapted to store an operating system (OS) 606, as well as application programs 608. The processor 602 can be coupled, either directly or via appropriate intermediary hardware, to a display 610 and to one or more input/output (I/O) devices 612, such as a keypad, a touch panel sensor, a microphone, and the like. Similarly, in some embodiments, the processor 602 can be coupled to a transceiver 614 that interfaces with an antenna 616. The transceiver 614 can be configured to both transmit and receive cellular network signals, wireless data signals, or other types of signals via the antenna 616, depending on the nature of the mobile device 600. Further, in some configurations, a GPS receiver 618 can also make use of the antenna 616 to receive GPS signals.

Modules, Components and Logic

Certain embodiments are described herein as including logic or a number of components, modules, or mechanisms. Modules can constitute either software modules (e.g., code embodied (1) on a non-transitory machine-readable medium or (2) in a transmission signal) or hardware-implemented modules. A hardware-implemented module is a tangible unit capable of performing certain operations and can be configured or arranged in a certain manner. In example embodiments, one or more computer systems (e.g., a standalone, client or server computer system) or one or more processors 602 can be configured by software (e.g., an application or application portion) as a hardware-implemented module that operates to perform certain operations as described herein.

In various embodiments, a hardware-implemented module can be implemented mechanically or electronically. For example, a hardware-implemented module can comprise dedicated circuitry or logic that is permanently configured (e.g., as a special-purpose processor, such as a field programmable gate array (FPGA) or an application-specific integrated circuit (ASIC)) to perform certain operations. A hardware-implemented module can also comprise programmable logic or circuitry (e.g., as encompassed within a general-purpose processor 602 or other programmable processor 602) that is temporarily configured by software to perform certain operations. It will be appreciated that the decision to implement a hardware-implemented module mechanically, in dedicated and permanently configured circuitry, or in temporarily configured circuitry (e.g., configured by software) can be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor 602 configured using software, the general-purpose processor 602 can be configured as respective different hardware-implemented modules at different times. Software can accordingly configure a processor 602, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules can be regarded as being communicatively coupled. Where multiple of such hardware-implemented modules exist contemporaneously, communications can be achieved through signal transmission (e.g., over appropriate circuits and buses that connect the hardware-implemented modules). In embodiments in which multiple hardware-implemented modules are configured or instantiated at different times, communications between such hardware-implemented modules can be achieved, for example, through the storage and retrieval of information in memory structures to which the multiple hardware-implemented modules have access. For example, one hardware-implemented module can perform an operation, and store the output of that operation in a memory device to which it is communicatively coupled. A further hardware-implemented module can then, at a later time, access the memory device to retrieve and process the stored output. Hardware-implemented modules can also initiate communications with input or output devices, and can operate on a resource (e.g., a collection of information).

The various operations of example methods described herein can be performed, at least partially, by one or more processors 602 that are temporarily configured (e.g., by software) or permanently configured to perform the relevant operations. Whether temporarily or permanently configured, such processors 602 can constitute processor-implemented modules that operate to perform one or more operations or functions. The modules referred to herein can, in some example embodiments, comprise processor-implemented modules.

Similarly, the methods described herein can be at least partially processor-implemented. For example, at least some of the operations of a method can be performed by one or processors 602 or processor-implemented modules. The performance of certain of the operations can be distributed among the one or more processors 602, not only residing within a single machine, but deployed across a number of machines. In some example embodiments, the processor 602 or processors 602 can be located in a single location (e.g., within a home environment, an office environment or as a server farm), while in other embodiments the processors 602 can be distributed across a number of locations.

The one or more processors 602 can also operate to support performance of the relevant operations in a "cloud computing" environment or as a "software as a service" (SaaS). For example, at least some of the operations can be performed by a group of computers (as examples of machines including processors 602), these operations being accessible via a network (e.g., the Internet) and via one or more appropriate interfaces (e.g., application program interfaces (APIs).)

Electronic Apparatus and System

Example embodiments can be implemented in digital electronic circuitry, or in computer hardware, firmware, software, or in combinations of them. Example embodiments can be implemented using a computer program product, e.g., a computer program tangibly embodied in an information carrier, e.g., in a machine-readable medium for execution by, or to control the operation of, data processing apparatus, e.g., a programmable processor 602, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations can be performed by one or more programmable processors 602 executing a computer program to perform functions by operating on input data and generating output. Method operations can also be performed by, and apparatus of example embodiments can be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor 602), or a combination of permanently and temporarily configured hardware can be a design choice. Below are set out hardware (e.g., machine) and software architectures that can be deployed, in various example embodiments.

Example Machine Architecture and Machine-Readable Medium

Figure 7:
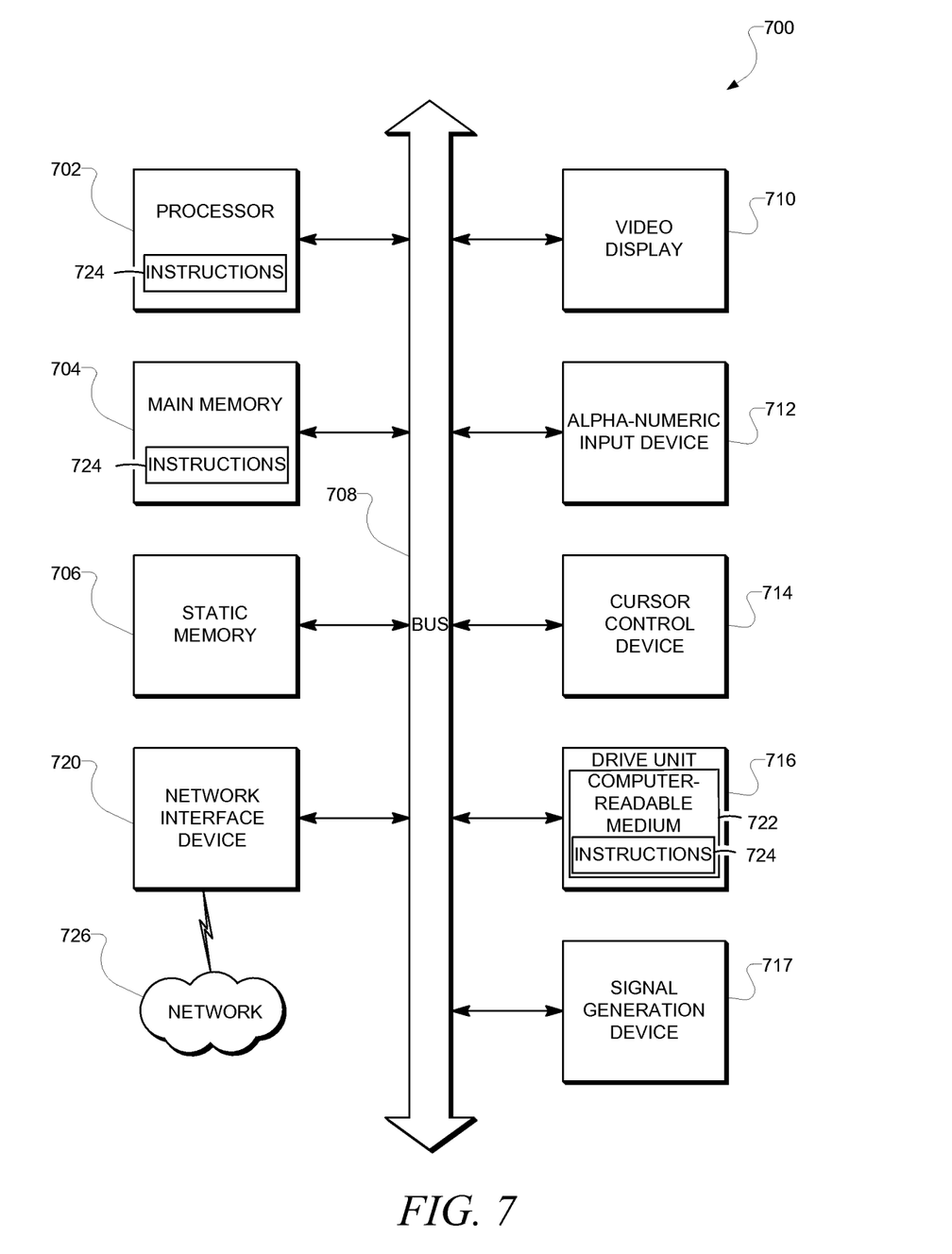
FIG. 7 is a block diagram of machine in the example form of a computer system within which instructions, for causing the machine to perform any one or more of the methodologies discussed herein, can be executed.

FIG. 7 is a block diagram of machine in the example form of a computer system 700 within which instructions, for causing the machine to perform any one or more of the methodologies discussed herein, can be executed. In alternative embodiments, the machine operates as a standalone device or can be connected (e.g., networked) to other machines. In a networked deployment, the machine can operate in the capacity of a server or a client machine in server-client network environment, or as a peer machine in a peer-to-peer (or distributed) network environment. The machine can be a personal computer (PC), a tablet PC, a set-top box (STB), a personal digital assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU) or both), a main memory 704 and a static memory 706, which communicate with each other via a bus 708. The computer system 700 can further include a video display unit 710 (e.g., a liquid crystal display (LCD) or a cathode ray tube (CRT)). The computer system 700 also includes an alphanumeric input device 712 (e.g., a keyboard or a touch-sensitive display screen), a user interface (UI) navigation device 714 (e.g., a mouse), a disk drive unit 716, a signal generation device 717 (e.g., a speaker) and a network interface device 720.

Machine-Readable Medium

The disk drive unit 716 includes a machine-readable medium 722 on which is stored one or more sets of instructions and data structures (e.g., software) 724 embodying or utilized by any one or more of the methodologies or functions described herein. The instructions 724 can also reside, completely or at least partially, within the main memory 704 and/or within the processor 702 during execution thereof by the computer system 700, the main memory 704 and the processor 702 also constituting machine-readable media 722.

While the machine-readable medium 722 is shown in an example embodiment to be a single medium, the term "machine-readable medium" can include a single medium or multiple media (e.g., a centralized or distributed database, and/or associated caches and servers) that store the one or more instructions 724 or data structures. The term "machine-readable medium" shall also be taken to include any tangible medium that is capable of storing, encoding or carrying instructions 724 for execution by the machine and that cause the machine to perform any one or more of the methodologies of the present disclosure or that is capable of storing, encoding or carrying data structures utilized by or associated with such instructions 724. The term "machine-readable medium" shall accordingly be taken to include, but not be limited to, solid-state memories, and optical and magnetic media. Specific examples of machine-readable media 722 include non-volatile memory, including, by way of example, semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

Transmission Medium

The instructions 724 can further be transmitted or received over a communications network 726 using a transmission medium. The instructions 724 can be transmitted using the network interface device 720 and any one of a number of well-known transfer protocols (e.g., HTTP). Examples of communication networks include a local area network ("LAN"), a wide area network ("WAN"), the Internet, mobile telephone networks, plain old telephone (POTS) networks, and wireless data networks (e.g., WiFi and WiMax networks). The term "transmission medium" shall be taken to include any intangible medium that is capable of storing, encoding or carrying instructions 724 for execution by the machine, and includes digital or analog communications signals or other intangible media to facilitate communication of such software.

Although an embodiment has been described with reference to specific example embodiments, it will be evident that various modifications and changes can be made to these embodiments without departing from the broader spirit and scope of the disclosure. Accordingly, the specification and drawings are to be regarded in an illustrative rather than a restrictive sense. The accompanying drawings that form a part hereof, show by way of illustration, and not of limitation, specific embodiments in which the subject matter can be practiced. The embodiments illustrated are described in sufficient detail to enable those skilled in the art to practice the teachings disclosed herein. Other embodiments can be utilized and derived therefrom, such that structural and logical substitutions and changes can be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter can be referred to herein, individually and/or collectively, by the term "invention" merely for convenience and without intending to voluntarily limit the scope of this application to any single invention or inventive concept if more than one is, in fact, disclosed. Thus, although specific embodiments have been illustrated and described herein, it should be appreciated that any arrangement calculated to achieve the same purpose can be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method for performing event stream processing the method comprising:
    receiving, at an event stream processing engine, a plurality of event streams from a plurality of input adapters, at least a first input adapter of the plurality of input adapters being located on a separate and distinct virtual machine than a second input adapter of the plurality of input adapters;
    transforming event stream data from the first input adapter and event stream data from the second input adapter into data of a single data type;
    storing the transformed data in an in-memory database; and
    performing real-time analysis on the transformed data by accessing windows of the transformed data from the in-memory database based on rules defined in the event stream processing engine, wherein the event stream processing engine and the in-memory database are part of a first cloud and the method further comprises retrieving information by the event stream processing engine from a second cloud and using the information from the second cloud to execute the rules.

2. The method of claim 1, wherein the first input adapter and the second input adapter are not stored on a shared architecture as part of a restrictive tenant arrangement.

3. The method of claim 1, further comprising using the event stream processing engine to check for duplicates in the transformed data in the in-memory database.

4. The method of claim 1, further comprising using the event stream processing engine to perform advanced business process modeling on the transformed data in the in-memory database.

5. The method of claim 1, wherein the transforming includes modifying a data format of the event stream data from the first input adapter to match a data format of the event stream data from the second input adapter.

6. The method of claim 1, wherein the transforming includes modifying a data format of the event stream data from the second input adapter to match a data format of the event stream data from the first input adapter.

7. The method of claim 1, wherein the transforming includes modifying a data format of the event stream data from the first input adapter and a data format of the event stream data from the second input adapter to a data format different than either the data format of the event stream from the first input adapter or the data format of the event stream from the second input adapter.

8. An system comprising:
    an in-memory database;
    an event stream processing engine executable by one or more processors and configured to:
        receive a plurality of event streams from a plurality of input adapters, at least a first input adapter of the plurality of input adapters being located on a separate and distinct virtual machine than a second input adapter of the plurality of input adapters;
        transform event stream data from the first input adapter and event stream data from the second input adapter into data of a single data type;
        store the transformed data in the in-memory database; and
        perform real-time analysis on the transformed data by accessing windows of the transformed data from the in-memory database based on rules defined in the event stream processing engine, wherein the system is located in a first cloud and the event stream processing engine is further configured to retrieve data from a second cloud and use the data from the second cloud in the performing of real-time analysis on the transformed data.

9. The system of claim 8, wherein the in-memory database includes an index server where the transformed data is stored.

10. The system of claim 9, wherein the in-memory database further includes an engine providing for human/computer interactions.

11. The system of claim 9, further comprising a high-bandwidth channel between the in-memory database and the event stream processing engine.

12. A non-transitory machine-readable storage medium comprising instructions which, when implemented by one or more machines, cause the one or more machines to perform operations comprising:

receiving, at an event stream processing engine, a plurality of event streams from a plurality of input adapters, at least a first input adapter of the plurality of input adapters being located on a separate and distinct virtual machine than a second input adapter of the plurality of input adapters;

transforming event stream data from the first input adapter and event stream data from the second input adapter into data of a single data type;

storing the transformed data in an in-memory database; and     performing real-time analysis on the transformed data by accessing windows of the transformed data from the in-memory database based on rules defined in the event stream processing engine, wherein the event stream processing engine and the in-memory database are part of a first cloud and the method further comprises retrieving information by the event stream processing engine from a second cloud and using the information from the second cloud to execute the rules.

13. The non-transitory machine-readable storage medium of claim 12, wherein the first input adapter and the second input adapter are not stored on a shared architecture as part of a restrictive tenant arrangement.

14. The non-transitory machine-readable storage medium of claim 12, wherein the operations further comprise using the event stream processing engine to check for duplicates in the transformed data in the in-memory database.

15. The non-transitory machine-readable storage medium of claim 12, wherein the operations further comprise using the event stream processing engine to perform advanced business process modeling on the transformed data in the in-memory database.

16. The non-transitory machine-readable storage medium of claim 12, wherein the transforming includes modifying a data format of the event stream data from the first input adapter to match a data format of the event stream data from the second input adapter.

17. The non-transitory machine-readable storage medium of claim 12, wherein the transforming includes modifying a data format of the event stream data from the second input adapter to match a data format of the event stream data from the first input adapter.

\* \* \* \* \*